United States Patent
Xie et al.

(10) Patent No.: US 9,247,502 B2
(45) Date of Patent: Jan. 26, 2016

(54) METHOD AND APPARATUS FOR POWER MANAGEMENT ON MOBILE DEVICES AND ASSOCIATED MOBILE DEVICES

(71) Applicants: Shell Internet (Beijing) Security Technology Co., Ltd., Beijing (CN); Beijing Kingsoft Internet Security Software Co., Ltd., Beijing (CN); Conew Network Technology (Beijing) Co., Ltd., Beijing (CN)

(72) Inventors: Hongliang Xie, Beijing (CN); Pengbo Yang, Beijing (CN); Yunfei Lu, Beijing (CN); Ming Xu, Beijing (CN)

(73) Assignees: SHELL INTERNET (BEIJING) SECURITY TECHNOLOGY CO., LTD., Beijing (CN); BEIJING KINGSOFT INTERNET SECURITY SOFTWARE CO., LTD., Beijing (CN); CONEW NETWORK TECHNOLOGY (BEIJING) CO., LTD., Beijing (CN)

(*) Notice: Subject to any disclaimer, the term of this patent is extended or adjusted under 35 U.S.C. 154(b) by 101 days.

(21) Appl. No.: 13/945,093

(22) Filed: Jul. 18, 2013

(65) Prior Publication Data
US 2014/0024416 A1 Jan. 23, 2014

(30) Foreign Application Priority Data
Jul. 19, 2012 (CN) .......................... 2012 1 0251390

(51) Int. Cl.
*H04W 52/02* (2009.01)

(52) U.S. Cl.
CPC ...... *H04W 52/0261* (2013.01); *H04W 52/0296* (2013.01); *Y02B 60/50* (2013.01)

(58) Field of Classification Search
CPC .......... Y02B 60/50; H04W 52/0251–52/0267; H04M 1/73
USPC .............. 455/405, 418–420, 423, 425, 456.4, 455/572, 574; 713/320–324, 340, 300, 330
See application file for complete search history.

(56) References Cited

U.S. PATENT DOCUMENTS

| | | | |
|---|---|---|---|
| 2002/0044763 A1* | 4/2002 | Wehmeyer et al. | 386/83 |
| 2006/0143483 A1* | 6/2006 | Liebenow | 713/300 |
| 2009/0094473 A1* | 4/2009 | Mizutani | 713/340 |
| 2012/0169608 A1* | 7/2012 | Forutanpour et al. | 345/173 |

(Continued)

*Primary Examiner* — George Eng
*Assistant Examiner* — Umair Ahsan
(74) *Attorney, Agent, or Firm* — Morgan, Lewis & Bockius LLP

(57) ABSTRACT

The present invention provides method and apparatus for power management of mobile devices and associated mobile devices. The method for power management of mobile devices includes acquiring a predefined battery power level variation Δn of the mobile device and its corresponding usage time t1 if the mobile device uses the power-saving functions; acquiring the same battery power level variation Δn of the mobile device and its corresponding usage time t2 if the mobile device does not use any power-saving function; and determining an extended usage time of the mobile device Δt=t1−t2, and notifying the user of the mobile device the extended usage time. By determining the extended usage time and notifying the user of the extended usage time, the user of the mobile device can have a better understanding of the usage state of the mobile device after adopting the power-saving functions and therefore an improved user experience.

20 Claims, 6 Drawing Sheets

(56) References Cited

U.S. PATENT DOCUMENTS

2012/0198262 A1* 8/2012 Sauerwein et al. ........... 713/340
2013/0138989 A1* 5/2013 Jang et al. .................... 713/340
2013/0173947 A1* 7/2013 Nomura et al. ............... 713/340

* cited by examiner

METHOD AND APPARATUS FOR POWER MANAGEMENT ON MOBILE DEVICES AND ASSOCIATED MOBILE DEVICES

RELATED APPLICATIONS

This application claims priority to Chinese Patent Application No. 201210251390.0, entitled "Method and apparatus for power management on mobile devices and associated mobile devices," filed on Jul. 19, 2012, which is incorporated by reference in its entirety.

TECHNICAL FIELD

The present invention relates to the field of power management of mobile devices, and particularly to method and apparatus for power management on mobile devices and associated mobile devices.

BACKGROUND

Because of excessive dependence on its screen as input and output devices, in addition to a variety of system software features and services, a smartphone's battery power consumption is very fast. To solve this problem, there are many prior art technologies for optimizing or saving the battery power consumption of a smartphone. Nonetheless, these power-saving functions usually do not provide a user of the smartphone enough information as to the effect of these power-saving functions, or how long the usage time of the smartphone has been extended. As a result, the user is unable to make reasonable arrangements to the usage of the smartphone.

SUMMARY

The present invention is to provide a method and apparatus for power management on a mobile device and the associated mobile device, which can notify the user of the mobile device the extended usage time of the mobile device after using the power-saving functions such that the user has a better understanding the usage status of the mobile device, thereby improving the user experience.

To solve this technical problem, multiple embodiments of the present invention are provided below.

In one aspect of the present invention, a method for power management of mobile devices, includes: acquiring a predefined battery power level variation $\Delta n$ of the mobile device and its corresponding usage time $t1$ if the mobile device uses the power-saving functions; acquiring the same battery power level variation $\Delta n$ of the mobile device and its corresponding usage time $t2$ if the mobile device does not use any power-saving function; and determining an extended usage time of the mobile device $\Delta t=t1-t2$, and notifying the user of the mobile device the extended usage time.

In some embodiments, the step of acquiring the predefined battery power level variation $\Delta n$ of the mobile device and its corresponding usage time $t1$ if the mobile device uses the power-saving functions further includes: while the mobile device is in use, acquiring at least two battery power level samples of the mobile device corresponding to two different time samples and the battery power level sample corresponding to the last time sample is the most recent sampled value; establishing a real-time battery power consumption model according to the two battery power level samples of the mobile device at the two different time samples as well as an amount of battery power level variation between the two different time samples; and according to the real-time battery power consumption model of the mobile device, determining the usage time $t1$ corresponding to the battery power level variation $\Delta n$ while the mobile device uses the user-selected power-saving functions.

In some embodiments, the steps of acquiring at least two battery power level samples of the mobile device corresponding to two different time samples and the battery power level sample corresponding to the last time sample is the most recent sampled value while the mobile device is in use and establishing a real-time battery power consumption model according to the two battery power level samples of the mobile device at the two different time samples as well as an amount of battery power level variation between the two different time samples further include: receiving a first real-time battery power level sample and a corresponding first time sample; receiving a second real-time battery power level sample and a corresponding second time sample; in a coordinate system with time being its horizontal axis and battery power level being its vertical axis, define a line or curve connecting a first point defined by the first battery power level sample and the first time sample and a second point defined by the second battery power level sample and the second time sample.

In some embodiments, the steps of acquiring at least two battery power level samples of the mobile device corresponding to two different time samples and the battery power level sample corresponding to the last time sample is the most recent sampled value while the mobile device is in use and establishing a real-time battery power consumption model according to the two battery power level samples of the mobile device at the two different time samples as well as an amount of battery power level variation between the two different time samples further include: receiving a first real-time battery power level sample and a corresponding first time sample; receiving a second real-time battery power level sample and a corresponding second time sample; receiving a third real-time battery power level sample and a corresponding third time sample; in a coordinate system with time being its horizontal axis and battery power level being its vertical axis, define a curve connecting a first point defined by the first battery power level sample and the first time sample, a second point defined by the second battery power level sample and the second time sample and a third point defined by the third battery power level sample and the third time sample.

In some embodiments, the step of determining the usage time $t1$ corresponding to the battery power level variation $\Delta n$ according to the real-time battery power consumption model of the mobile device while the mobile device uses the user-selected power-saving functions further includes: using the aforementioned line or curve, determining a time value $ta1$ when the mobile device has a predefined power value $na1$ and a time value $tb1$ when the mobile device has a predefined power value $nb1$, wherein $na1-nb1=\Delta n$; and determining a usage time $t1=tb1-ta1$ when the mobile device's battery power level variation is $\Delta n$ according to the real-time battery power consumption model.

In some embodiments, the step of acquiring the same battery power level variation $\Delta n$ of the mobile device and its corresponding usage time $t2$ if the mobile device does not use any power-saving function further includes: while the mobile device is in initial use (and before adopting the power-saving functions), acquiring at least two battery power level samples of the mobile device corresponding to two different time samples; establishing a battery power consumption prediction model according to the two battery power level samples of the mobile device at the two different time samples as well as an amount of battery power level variation between the two different time samples; and according to the battery power consumption prediction model of the mobile device, determining the usage time period t2 corresponding to the battery power level variation Δn when the mobile device does not use the power-saving functions.

In some embodiments, the steps of acquiring at least two battery power level samples of the mobile device corresponding to two different time samples while the mobile device is in initial use (and before adopting the power-saving functions) and establishing a battery power consumption prediction model according to the two battery power level samples of the mobile device at the two different time samples as well as an amount of battery power level variation between the two different time samples further include: receiving a first real-time battery power level sample and a corresponding first time sample; receiving a second real-time battery power level sample and a corresponding second time sample; in a coordinate system with time being its horizontal axis and battery power level being its vertical axis, define a line or curve connecting a first point defined by the first battery power level sample and the first time sample and a second point defined by the second battery power level sample and the second time sample.

In some embodiments, the steps of acquiring at least two battery power level samples of the mobile device corresponding to two different time samples while the mobile device is in initial use (and before adopting the power-saving functions) and establishing a battery power consumption prediction model according to the two battery power level samples of the mobile device at the two different time samples as well as an amount of battery power level variation between the two different time samples further include: receiving a first real-time battery power level sample and a corresponding first time sample; receiving a second real-time battery power level sample and a corresponding second time sample; receiving a third real-time battery power level sample and a corresponding third time sample; in a coordinate system with time being its horizontal axis and battery power level being its vertical axis, define a curve connecting a first point defined by the first battery power level sample and the first time sample, a second point defined by the second battery power level sample and the second time sample and a third point defined by the third battery power level sample and the third time sample.

In some embodiments, the step of determining the usage time period t2 corresponding to the battery power level variation Δn when the mobile device does not use the power-saving functions according to the battery power consumption prediction model of the mobile device further includes: using the aforementioned line or curve and while the mobile device does not use the power-saving features, determining a time value ta2 when the mobile device has a predefined power value na2 and a time value tb2 when the mobile device has a predefined power value nb2, wherein na2−nb2=Δn; and determining a usage time t2=tb2−ta2 when the mobile device's battery power level variation is Δn according to the battery power consumption prediction model.

In another aspect of the present application, a power management apparatus used in a mobile device includes: a first acquisition module configured to acquire a predefined battery power level variation Δn of the mobile device and its corresponding usage time t1 if the mobile device uses the power-saving functions; a second acquisition module configured to acquire the same battery power level variation Δn of the mobile device and its corresponding usage time t2 if the mobile device does not use any power-saving function; and a processing module configured to determine the extended usage time of the mobile device Δt=t1−t2, and notify the user of the mobile device the extended usage time.

In yet another aspect of the present invention, a mobile device including the power management apparatus is disclosed.

In some aspects of the present application, a method for power management of a mobile device, comprises: at the mobile device having one or more processors, memory and a display: displaying multiple power-saving functions on the display; detecting user selections of one or more of the power-saving functions; turning on the user-selected power-saving functions; for a predefined battery power level variation Δn: collecting multiple real-time battery power level samples; and determining a usage time t1 based on the collected real-time battery power level samples; comparing the usage time t1 with a usage time t2, wherein the usage time t2 corresponds to the predefined battery power level variation Δn while the user-selected power-saving functions are off; determining an extended usage time of the mobile device Δt=t1−t2; and displaying the extended usage time on the display.

In some aspects of the present application, a mobile device comprises one or more processors; memory; and one or more program modules stored in the memory and to be executed by the one or more processors, the one or more program modules including instructions for: displaying multiple power-saving functions on a display of the mobile device; detecting user selections of one or more of the power-saving functions; turning on the user-selected power-saving functions; for a predefined battery power level variation Δn: collecting multiple real-time battery power level samples; and determining a usage time t1 based on the collected real-time battery power level samples; comparing the usage time t1 with a usage time t2, wherein the usage time t2 corresponds to the predefined battery power level variation Δn while the user-selected power-saving functions are off; determining an extended usage time of the mobile device Δt=t1−t2; and displaying the extended usage time Δt on the display.

In some aspects of the present application, a non-transitory computer readable medium is used in conjunction with a mobile device for power management, the mobile device having one or more processors, memory and a display, the computer readable medium comprising instructions for: displaying multiple power-saving functions on the display; detecting user selections of one or more of the power-saving functions; turning on the user-selected power-saving functions; for a predefined battery power level variation Δn: collecting multiple real-time battery power level samples; and determining a usage time t1 based on the collected real-time battery power level samples; comparing the usage time t1 with a usage time t2, wherein the usage time t2 corresponds to the predefined battery power level variation Δn while the user-selected power-saving functions are off; determining an extended usage time of the mobile device Δt=t1−t2; and displaying the extended usage time on the display.

In sum, by determining the extended usage time and notifying the user of the extended usage time, the user of the mobile device can have a better understanding of the usage state of the mobile device after adopting the power-saving functions and therefore an improved user experience.

BRIEF DESCRIPTION OF THE DRAWINGS

As a part of the application and for further understanding of the present invention, the accompanying drawings are used to explain the exemplary embodiments of the present invention, instead of limiting the present invention in an improper way, wherein.

Like reference numerals refer to corresponding parts throughout the drawings.

DETAILED DESCRIPTION

Reference will now be made in detail to implementations, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. The embodiments of the present invention are described in detail below with reference to the accompanying drawings, but the present invention can be implemented in different manners within the appended claims.

According to some embodiments of the present invention, a method and apparatus for power management on a mobile device and associated mobile device are provided. Using such method and apparatus, a user of the mobile device can find out the usage time extension of the mobile device after adopting the power-saving functions so that the user can have a better understanding of the usage state of the mobile device to improve the user experience.

Figure 1:
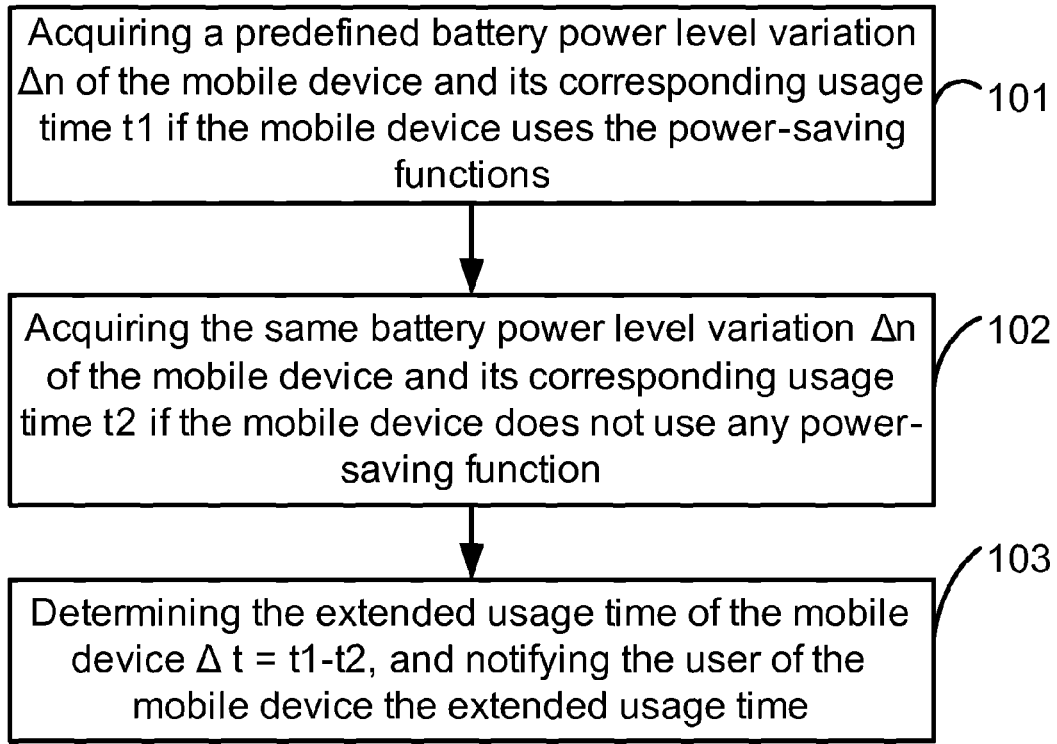
FIG. 1 is a flow chart of a mobile device power management method according to some embodiments of the present invention.

FIG. 1 is a flow chart of a mobile device power management method according to some embodiments of the present invention. As shown in FIG. 1, the method includes:

Step 101: Acquiring a predefined battery power level variation Δn of the mobile device and its corresponding usage time t1 if the mobile device uses the power-saving functions;

Step 102: Acquiring the same battery power level variation Δn of the mobile device and its corresponding usage time t2 if the mobile device does not use any power-saving function;

Step 103: Determining the extended usage time of the mobile device Δt=t1−t2, and notifying the user of the mobile device the extended usage time.

By determining the extended usage time and notifying the user of the extended usage time, the user of the mobile device can have a better understanding of the usage state of the mobile device after adopting the power-saving functions and therefore an improved user experience.

In another embodiment of the present invention, the above-mentioned step 101 further includes:

Step a1: While the mobile device is in use, acquiring at least two battery power level samples of the mobile device corresponding to two different time samples and the battery power level sample corresponding to the last time sample is the most recent sampled value;

Step a2: Establishing a real-time battery power consumption model according to the two battery power level samples of the mobile device at the two different time samples as well as an amount of battery power level variation between the two different time samples;

Step a3: According to the real-time battery power consumption model of the mobile device, determining the usage time t1 corresponding to the battery power level variation Δn while the mobile device uses the user-selected power-saving functions.

In some embodiments, the time samples and the battery power level samples are set to be 2, and the steps a1-a2 further include: receiving a first real-time battery power level sample and a corresponding first time sample; receiving a second real-time battery power level sample and a corresponding second time sample; in a coordinate system with time being its horizontal axis and battery power level being its vertical axis, define a line or curve connecting a first point defined by the first battery power level sample and the first time sample and a second point defined by the second battery power level sample and the second time sample.

In some embodiments, the step a3 further includes: using the aforementioned line or curve, determining a time value $t_{a1}$ when the mobile device has a predefined power value $n_{a1}$ and a time value $t_{b1}$ when the mobile device has a predefined power value $n_{b1}$, wherein $n_{a1}-n_{b1}=\Delta n$; and determining a usage time $t1=t_{b1}-t_{a1}$ when the mobile device's battery power level variation is Δn according to the real-time battery power consumption model.

In some embodiments, the time samples and the battery power level samples are set to be 3, and the steps a1-a2 further includes: receiving a first real-time battery power level sample and a corresponding first time sample; receiving a second real-time battery power level sample and a corresponding second time sample; receiving a third real-time battery power level sample and a corresponding third time sample; in a coordinate system with time being its horizontal axis and battery power level being its vertical axis, define a line or curve connecting a first point defined by the first battery power level sample and the first time sample, a second point defined by the second battery power level sample and the second time sample and a third point defined by the third battery power level sample and the third time sample.

In some embodiments, the step a3 further includes: using the aforementioned line or curve, determining a time value $t_{a1}$ when the mobile device has a predefined power value $n_{a1}$ and a time value $t_{b1}$ when the mobile device has a predefined power value $n_{b1}$, wherein $n_{a1}-n_{b1}=\Delta n$; and determining a usage time $t1=t_{b1}-t_{a1}$ when the mobile device's battery power level variation is Δn according to the real-time battery power consumption model.

In another embodiment of the present invention, the above-method step 102 further includes:

Step b1: While the mobile device is in initial use (and before adopting the power-saving functions), acquiring at least two battery power level samples of the mobile device corresponding to two different time samples;

Step b2: Establishing a battery power consumption prediction model according to the two battery power level samples of the mobile device at the two different time samples as well as an amount of battery power level variation between the two different time samples;

Step b3: According to the battery power consumption prediction model of the mobile device, determining the usage time period t2 corresponding to the battery power level variation Δn when the mobile device does not use the power-saving functions.

In some embodiments, the time samples and the battery power level samples are set to be 2, and the steps b1-b2 further include: receiving a first real-time battery power level sample and a corresponding first time sample; receiving a second real-time battery power level sample and a corresponding second time sample; in a coordinate system with time being its horizontal axis and battery power level being its vertical axis, define a line or curve connecting a first point defined by the first battery power level sample and the first time sample and a second point defined by the second battery power level sample and the second time sample.

In some embodiments, the step b3 further includes: using the aforementioned line or curve and while the mobile device does not use the power-saving features, determining a time value $t_{a2}$ when the mobile device has a predefined power value $n_{a1}$ and a time value $t_{b2}$ when the mobile device has a predefined power value $n_{b2}$, wherein $n_{a2} - n_{b2} = \Delta n$; and determining a usage time $t2 = t_{b2} - t_{a2}$ when the mobile device's battery power level variation is Δn according to the battery power consumption prediction model.

In some embodiments, the time samples and the battery power level samples are set to be 3, and the steps b1-b2 further include: receiving a first real-time battery power level sample and a corresponding first time sample; receiving a second real-time battery power level sample and a corresponding second time sample; receiving a third real-time battery power level sample and a corresponding third time sample; in a coordinate system with time being its horizontal axis and battery power level being its vertical axis, define a line or curve connecting a first point defined by the first battery power level sample and the first time sample, a second point defined by the second battery power level sample and the second time sample and a third point defined by the third battery power level sample and the third time sample.

In some embodiments, the step b3 further includes: using the aforementioned line or curve and while the mobile device does not use the power-saving features, determining a time value $t_{a2}$ when the mobile device has a predefined power value $n_{a2}$ and a time value $t_{b2}$ when the mobile device has a predefined power value $n_{b2}$, wherein $n_{a2} - n_{b2} = \Delta n$; and determining a usage time $t2 = t_{b2} - t_{a2}$ when the mobile device's battery power level variation is Δn according to the battery power consumption prediction model.

Below is a specific embodiment of a mobile device power management method, which includes the following Steps 1-4:

Step 1, when the mobile device starts running, generate a battery power consumption prediction model C1.

A more specific generating method uses the samples of the battery power level variations. For example, whenever there is a battery power level variation at the mobile device, a notification from the mobile device is detected and a data sample of the battery power level variation is generated. By doing so, the recorded data samples include at least two initial time samples and corresponding battery power level samples.

Figure 2:
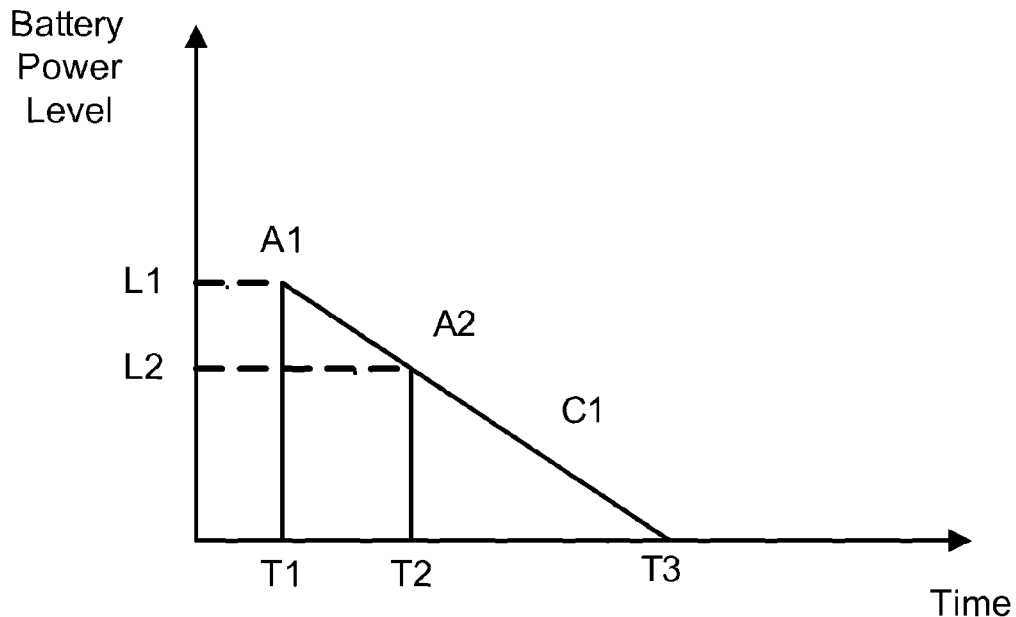
FIG. 2 is a block diagram of a battery power consumption prediction model C1 according to some embodiments of the present invention.

Among others, the two initial time samples and the corresponding battery power level samples can be used for generating the battery power consumption prediction model C1. For example, when the mobile device operates initially, a first data point A1 is recorded, the recorded information including the current power (i.e., the first battery power level sample L1) and the current time (the first time sample T1); when there is a new change to the mobile device's power, a new notification is received and a second data point A2 is recorded, the recorded information including the current power (i.e., the second battery power level sample L2) and the current time (the second time sample T2). Based on the two data points A1 and A2, a battery power consumption prediction model C1 is established, e.g., in the form of a straight line as shown in FIG. 2 with the follow expression:

$$Y = \left(\frac{L2 - L1}{T2 - T1}\right) * (X - T1) + L1$$

In some embodiments, it is possible to establish the battery power consumption prediction model C1 using at least three time points and their corresponding sample values.

Figure 3:
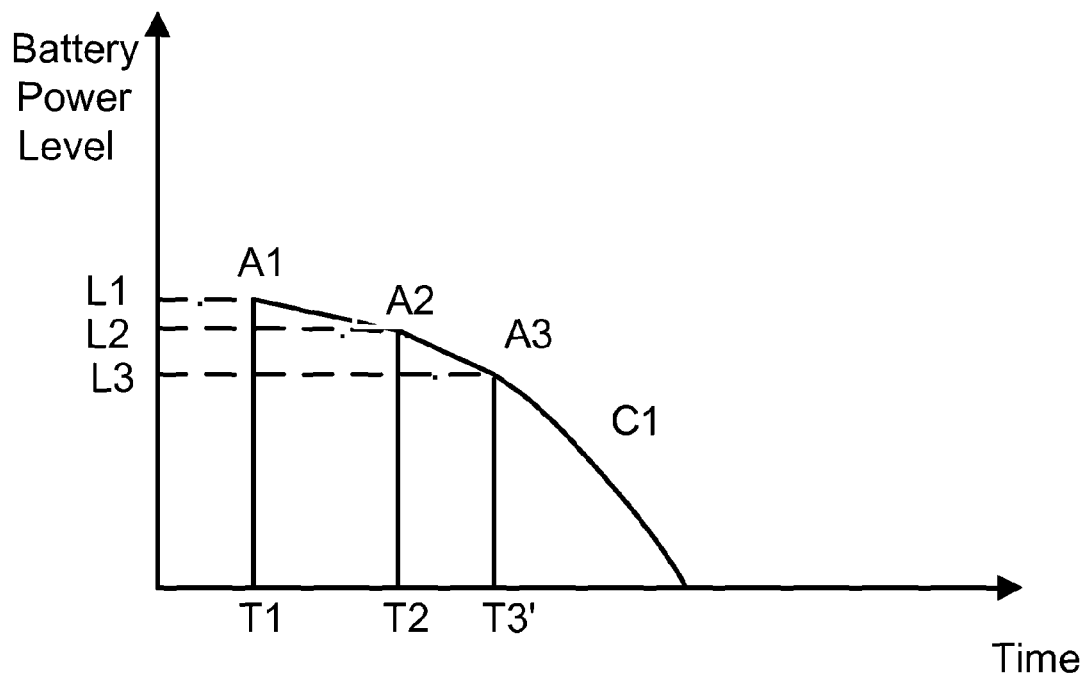
FIG. 3 is another block diagram of the battery power consumption prediction model C1 according to some embodiments of the present invention.

For example, after A1 and A2 is recorded and when there is a new change to the mobile device's power, a new notification is received and a third data point A3 is recorded (i.e., the third battery power level sample L3 and the third time sample T3'), and based on A1, A2 and A3, the battery power consumption prediction model C1 is established, e.g., in the form of a parabola as shown in FIG. 3 with the follow expression, $$Y = aX^2 + bX + c$$

where $$a = -\frac{-T2L1 + T3'L1 + T1L2 - T3'L2 - T1L3 + T2L3}{(-T1 + T2)*(T2 - T3')*(-T1 + T3')}$$

$$b = -\frac{T2^2L1 - T3'^2L1 - T1^2L2 + T3'^2L2 + T1^2L3 - T2^2L3}{(T1 - T2)*(T1 - T3')*(T2 - T3')}$$

$$c = -\frac{-T2^2T3'L1 + T2T3'^2L1 + T1^2T3'L2 - T1T3'^2L2 - T1^2T2L3 + T1T2^2L3}{(T2 - T3')*(T1^2 - T1T2 - T1T3' + T2T3')}$$

Step 2, define a real-time battery power consumption model C2

Figure 4:
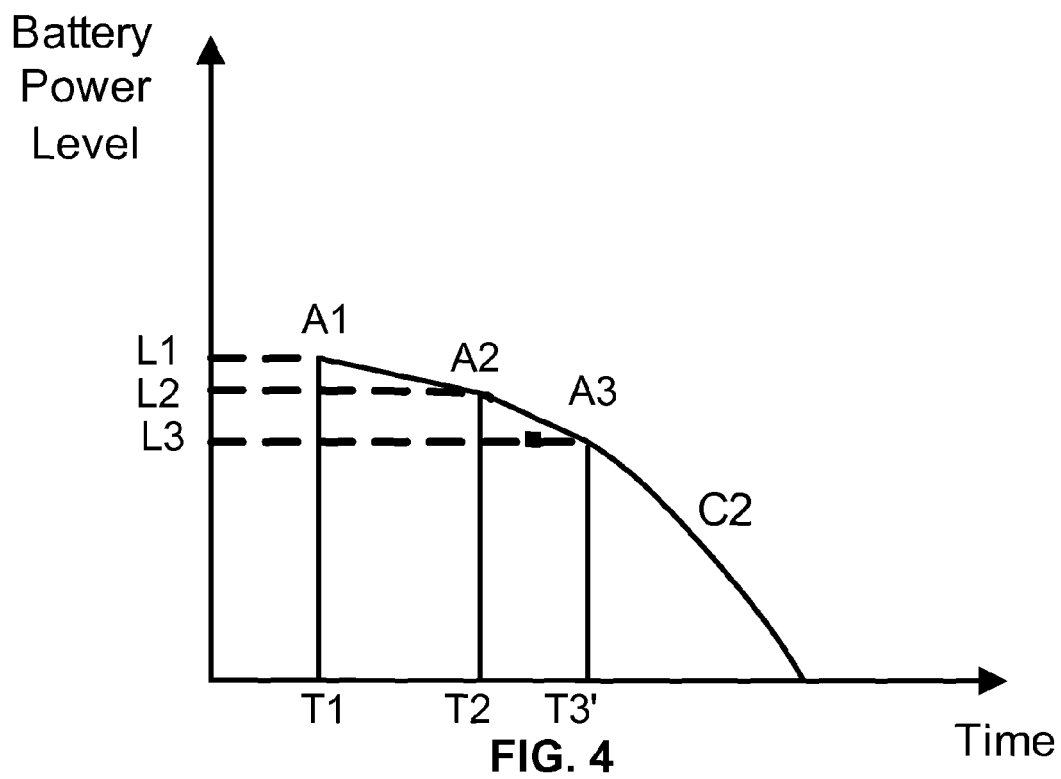
FIG. 4 is a block diagram of a real-time battery power consumption model C2 according to some embodiments of the present invention.

The generation of the real-time battery power consumption model C2 can reference the above-mentioned Step 1. The difference between Step 1 and Step 2 is that: in step 1 the two initial time samples and the corresponding battery power level samples are used for generating the battery power consumption prediction model C1; but among at least two battery power level samples of the mobile device and the corresponding two different time samples for building the real-time battery power consumption model C2, the battery power level sample corresponding to the last time sample is the most recent sampled value. As such, it is possible to use the latest time sample and associated battery power level sample to establish the real-time battery power consumption model C2, resulting a more accurate real-time battery power consumption model C2. With the decline of power, the recorded time sample and the corresponding battery power level sample are updated repeatedly. This first-in-first-out (FIFO) strategy ensures that the real-time battery power consumption model C2 is always drawn from the latest time sample and associated power sample. Assuming that three sample points are used, a parabolic real-time battery power consumption model C2 is depicted in FIG. 4.

Step 3, computing the extended usage time for the mobile device.

Specifically, using the battery power consumption prediction model C1, while the mobile device does not use the power-saving features, a time value $t_{a2}$ when the mobile device has a predefined power value $n_{a2}$ and a time value $t_{b2}$ when the mobile device has a predefined power value $n_{b2}$ are determined, wherein $n_{a2}-n_{b2}=\Delta n$; and a usage time $t2=t_{b2}-t_{a2}$ is then determined when the mobile device's battery power level variation is $\Delta n$ according to the battery power consumption prediction model.

Using the real-time battery power consumption model C2, a time value $t_{a1}$ when the mobile device has a predefined power value $n_{a1}$ and a time value $t_{b1}$ when the mobile device has a predefined power value $n_{b1}$ are determined, wherein $n_{a1}-n_{b1}=\Delta n$; and a usage time $t1=t_{b1}-t_{a1}$ is then determined when the mobile device's battery power level variation is $\Delta n$ according to the real-time battery power consumption model.

Finally the extended usage time of the mobile device $\Delta t$ is determined, i.e., $\Delta t=t1-t2$.

In other words, the extended usage time corresponds to the time difference between the curve C2 and the curve C1 at the same power percentage n. For example, a mobile phone may show on its display that its power is to drop to 80% of its current level at 10 AM according to the curve C1 if it does not invoke Kingsoft's battery doctor application's power saving mode but will drop to 80% of its current level at 11 AM according to the curve C2 if it switches to Kingsoft's battery doctor application's power saving mode. From such information, a user of the mobile phone can easily tell that the mobile phone's operation is extended an hour by Kingsoft's battery doctor application's power saving mode.

Step 4, the mobile device notifies the user of the calculated extended usage time.

Specifically, the mobile device may display the extended usage time on the mobile device's user interface. Alternatively, the mobile device can provide such information in an audio format in response to a user's request for the extended usage time.

In one embodiment, the current extended usage time of the mobile device is shown on the screen of the mobile device, which gets updated when the mobile device's power level changes.

Figure 5:
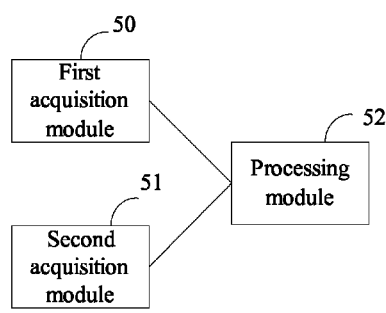
FIG. 5 is a block diagram of a power management apparatus used in a mobile device according to some embodiments of the present invention.

FIG. 5 is a block diagram of a power management apparatus used in a mobile device. As shown in FIG. 5, a power management apparatus includes:

A first acquisition module 50, configured to acquire a predefined battery power level variation $\Delta n$ of the mobile device and its corresponding usage time t1 if the mobile device uses the power-saving functions;

A second acquisition module 51, configured to acquire the same battery power level variation $\Delta n$ of the mobile device and its corresponding usage time t2 if the mobile device does not use any power-saving function; and A processing module 52, configured to determine the extended usage time of the mobile device $\Delta t=t1-t2$, and notify the user of the mobile device the extended usage time.

It should be noted that the above-described apparatus corresponds to the method described above. For example, the aforementioned model building as shown in FIGS. 2, 3 and 4 and the corresponding battery power level variation calculation methods are applicable to the apparatus and can achieve the same technical result.

Further, embodiments of the present invention include a mobile device comprising an apparatus as described above, e.g., a smartphones, tablet PCs and other mobile electronic devices, where the apparatus corresponds to the battery management module of such mobile device.

Figure 6:
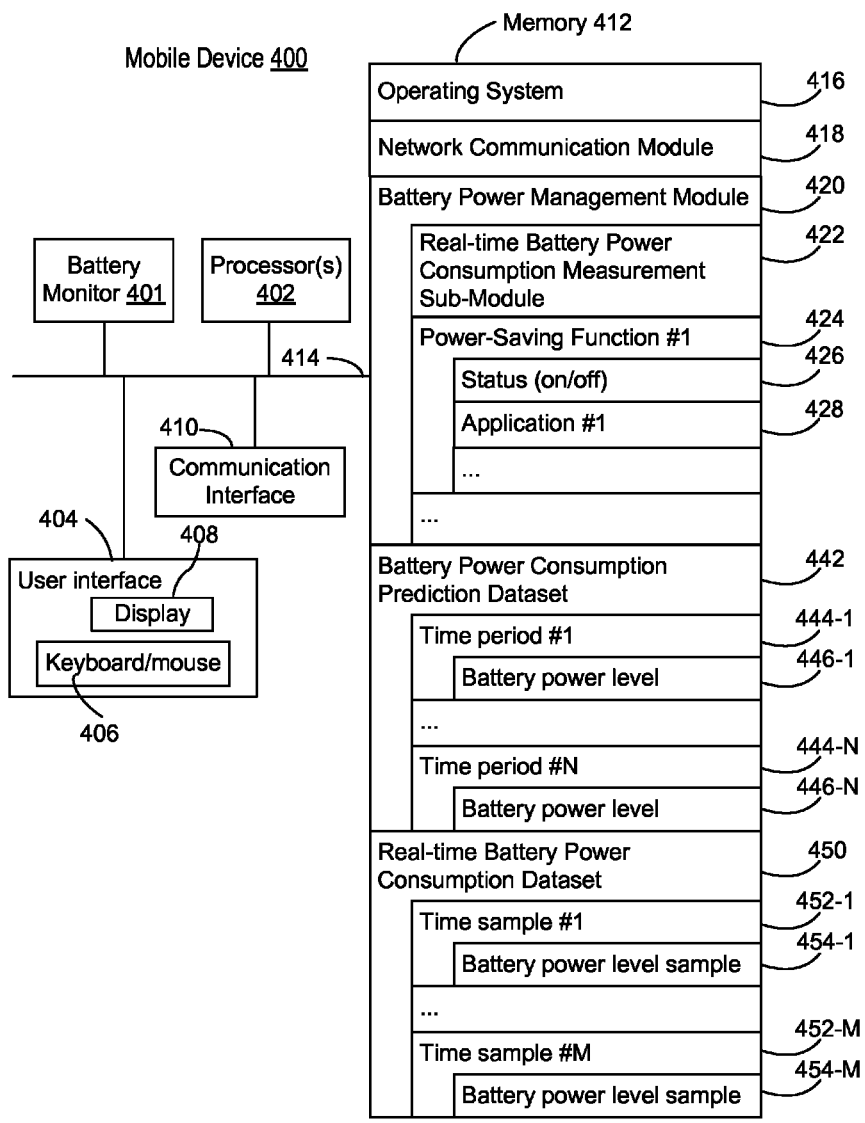
FIG. 6 is a block diagram of a mobile device according to some embodiments of the present invention.

FIG. 6 is a block diagram of a mobile device 400 according to some embodiments of the present invention. The mobile device 400 includes one or more processors 402 for executing modules, programs and/or instructions stored in memory 412 and thereby performing predefined operations; one or more network or other communications interfaces 410; memory 412; and one or more communication buses 414 for interconnecting these components. In some implementations, the mobile device 400 includes a user interface 404 comprising a display device 408 and one or more input devices 406 (e.g., keyboard or mouse), and a battery monitor 401 for monitoring the power level of the battery (not shown).

In some implementations, the memory 412 includes high-speed random access memory, such as DRAM, SRAM, DDR RAM or other random access solid state memory devices. In some implementations, memory 412 includes non-volatile memory, such as one or more magnetic disk storage devices, optical disk storage devices, flash memory devices, or other non-volatile solid state storage devices. In some implementations, memory 412 includes one or more storage devices remotely located from the processor(s) 402. Memory 412, or alternately one or more storage devices (e.g., one or more nonvolatile storage devices) within memory 412, includes a non-transitory computer readable storage medium. In some implementations, memory 412 or the computer readable storage medium of memory 412 stores the following programs, modules and data structures, or a subset thereof:

- an operating system 416 that includes procedures for handling various basic system services and for performing hardware dependent tasks;
- a network communications module 418 that is used for connecting the mobile device 400 to other computers (e.g., a remote web server) via the communication network interfaces 410 and one or more communication networks (wired or wireless), such as the Internet, other wide area networks, local area networks, metropolitan area networks, etc.;
- a battery power management module 420 for managing various power-saving functions as described above, each power-saving function 424 including a status 426 (e.g., on/off) and one or more applications 428 associated with the power-saving function 424; in some embodiments, the battery power management module 420 further including a real-time battery power consumption measurement sub-module 422 for collecting multiple real-time battery power level samples using, e.g., the battery monitor 401 and determining a usage time t1 based on the collected real-time battery power level samples for a predefined battery power level variation $\Delta n$;
- a battery power consumption prediction dataset 442 for building battery power consumption prediction models, the battery power consumption prediction dataset 442 including multiple entries, each entry including a respective battery power level (446-1, 446-N) and an associated time period (444-1, 444-N) it takes for the mobile device to reach the respective battery power level from a full battery power level; and
- a real-time battery power consumption dataset 450 for building real-time battery power consumption models, the real-time battery power consumption dataset 450 including multiple entries, each entry including a respective real-time battery power level sample (454-1, 454-M) and an associated time sample (452-1, 452-M).

In some embodiments, the mobile device displays multiple power-saving functions on the display. Upon detecting user selections of one or more of the power-saving functions, the mobile device turning on the user-selected power-saving functions. In order to quantify the effect of the user-selected power-saving functions, the mobile device collects multiple real-time battery power level samples and determines a usage time t1 based on the collected real-time battery power level samples for a predefined battery power level variation Δn (e.g., 80% of the full battery power level). Next, the mobile device compares the usage time t1 with a usage time t2. In some embodiments, the usage time t2 corresponds to the predefined battery power level variation Δn while the user-selected power-saving functions are off, which can be derived from the battery power consumption prediction dataset. Finally, the mobile device determines an extended usage time of the mobile device Δt=t1−t2 and then displays the extended usage time on the display. In some embodiments, the mobile device may keep multiple versions of the extended usage time Δt determined for different predefined battery power level variations (e.g., 95%, 90%, 85% of the full battery power level) at different times in the past. In this case, the mobile device may compare the newly-determined extended usage time Δt with the old versions and choose one of them for display. For example, the one to be displayed may be the maximum, minimum, average or median of all the different versions of the extended usage time Δt (including the newly-determined extended usage time Δt).

In some embodiments, the mobile device can also make power-saving suggestions to the user. For example, for the predefined battery power level variation Δn, the mobile device may determine a potential usage time t3 based on a combination of the collected real-time battery power level samples and the power-saving functions that the user has not selected yet. Such information may be derived from the battery power consumption prediction dataset 442 and the real-time battery power consumption dataset 450. Next, the mobile device compares the potential usage time t3 with the usage time t2 to determine a potentially extended usage time of the mobile device Δt'=t3−t2 and then displays the potentially extended usage time Δt' on the display. In some embodiments, the mobile device generates a power-conservation score for the user-selected power-saving functions based on the extended usage time Δt and the potentially extended usage time Δt' and displays the power-conservation score on the display along with the extended usage time Δt. If the user accepts the suggestion, the user can select the power-saving functions the user has not selected yet. In response to the user instruction, the mobile device updates the usage time t1 by collecting multiple real-time battery power level samples after turning on the newly user-selected power-saving functions and determining the updated usage time t1 based on the newly collected real-time battery power level samples. In other words, the mobile device can generate an updated usage time t1 by repeating the same process of calculating the original usage time t1.

Figure 7A:
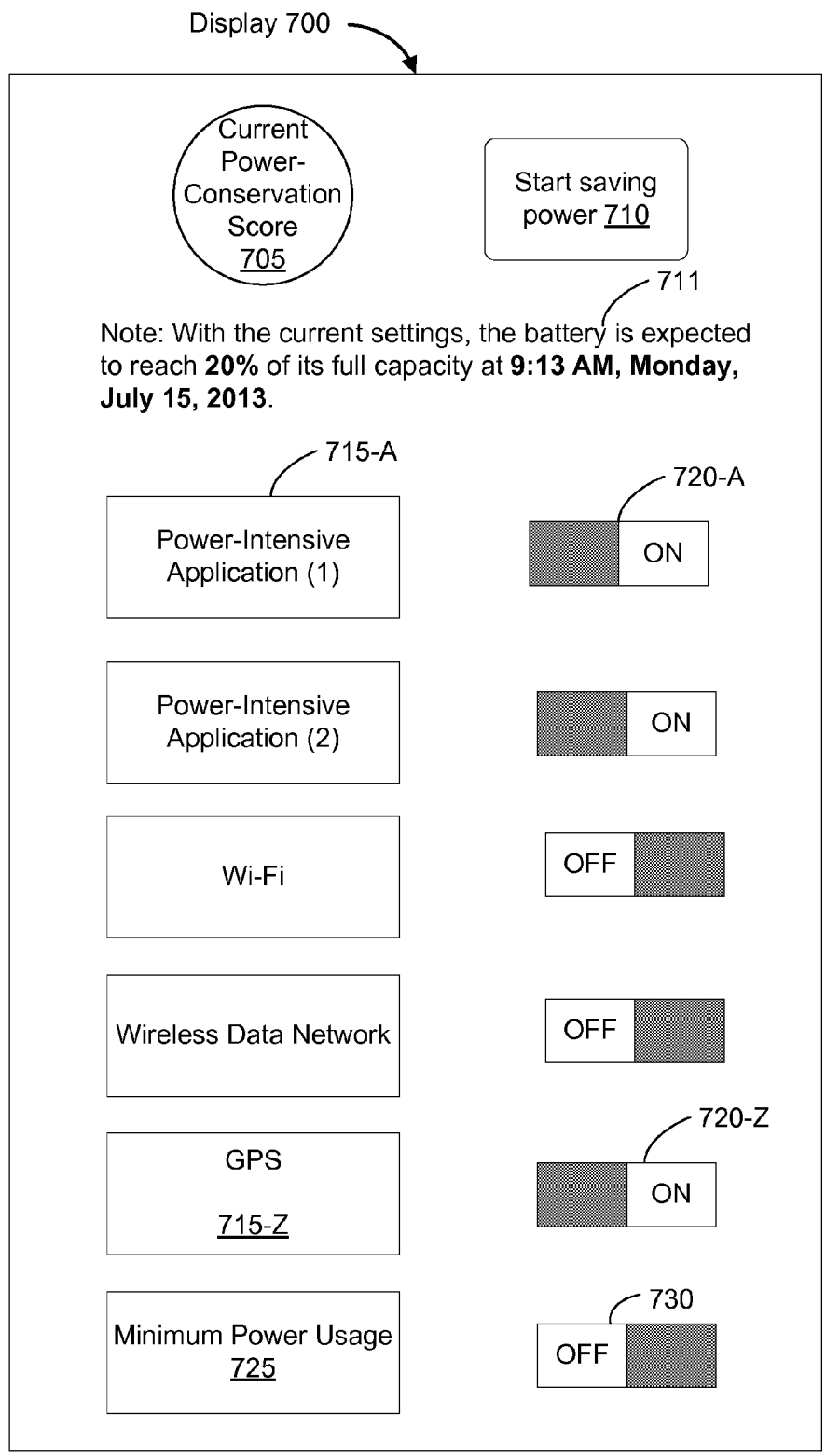
FIGS. 7A and 7B are exemplary screenshots of the display of a mobile device according to some embodiments of the present invention.
Figure 7B:
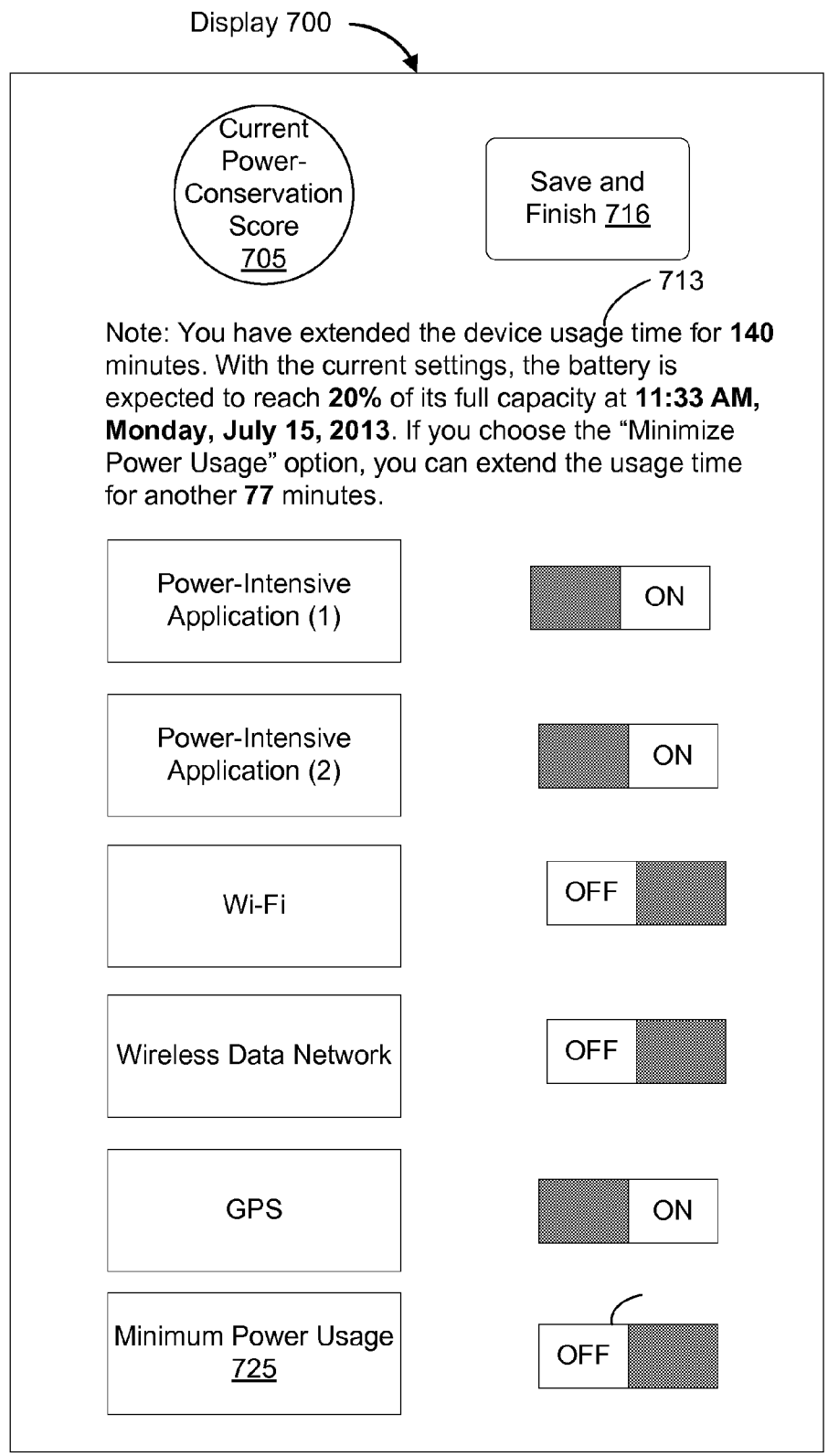

FIGS. 7A and 7B are exemplary screenshots of the display of a mobile device according to some embodiments of the present invention. As shown in FIG. 7A, the display 700 of the mobile device includes a current power-conservation score 705. The current power-conservation score 705 indicates the current power-efficiency level of the mobile device. For example, the mobile device may have a maximum standby time period after a full charge of its battery and the activation of main power-saving functions, which is defined as the target power efficiency level. A maximum power-conservation score for such target power efficiency level is 100. If the mobile device has not turned on any of the power-saving functions, the current power-conservation score may be only 45. This number provides the user information about the mobile device's potential capacity for extending its usage time before next power charge. In addition, a text description 711 is on the display, indicating at what time (e.g., in the form of a timestamp based on the mobile device's clock) the mobile device's battery will reach a predefined level (e.g., 20%), which is typically a level that the user can specify so as to receive an alert from the mobile device and charge the mobile device in time.

A set of individual power-saving functions (715-A to 715-Z) are shown in FIG. 7A, each having a control button (720-A to 720-Z). The user can interact with individual control buttons to manage the power consumption. For example, if the user is traveling with the mobile device in a remote area where there is no Wi-Fi or wireless data network connection but using the mobile device's GPS module for navigation, the user may temporarily turn off Wi-Fi and wireless data network but keep the GPS module on. After providing user selections of different power-saving functions, the user can press the "Start power saving" button 710 to implement the user-selected power-saving functions. In some embodiments, a user interaction with an individual control button replaces the current user interface shown on the display 700 with a new set of control buttons through which the user can select specific applications associated with a particular power-saving function. In this case, the user may need to switch through multiple user interfaces in order to choose the user-preferred power-saving functions. At the bottom of the display 700 is the "Minimum Power Usage" option 725. In some embodiments, the user may choose to reduce the power consumption of the mobile device to a level close to the power-off state. If this option is chosen (the button 730 being on), the mobile device turns on all the power-saving functions including those functions the user has not selected yet.

FIG. 7B depicts the result of applying the user-selected power-saving functions. First, the current power-conservation score 705 is updated from, e.g., 45 to 83. The change of the score can not only help the user appreciate the effectiveness of the user-selected power-saving functions (i.e., a score increase of 38) but also indicate how much room (e.g., a score of 15) is left for further improvement. Meanwhile, a new description 713 is provided to quantify the power-saving results. In this case, the description 713 not only discloses how much usage time (i.e., 140 minutes) has been extended. Moreover, it shows that at what time the battery may reach the target level (i.e., 20%) and therefore needs to be recharged. Furthermore, the description 713 also suggests how much more usage time (i.e., 77 minutes) the mobile device may gain if the "Minimum Power Usage" option 725 is enabled. If the user is satisfied with the current result, he or she can press the "Save and Finish" button 716 to accept the power-saving result. If not, the user can play with the power-saving functions on the display to further refine the power-saving result.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive set of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

The technical solution of the present invention enables mobile device users to, through extending usage time, understand the usage status of the mobile devices, better organization of the use of mobile devices, and improve the user experience.

Described in this specification many of the features are referred to as modules, in order to more particularly emphasize their implementation independence.

Embodiment of the invention, the modules can be implemented in software, so the types of processors. For example, an identifying module may include computer executable code instructions to one or more physical or logical blocks, for example, which can be constructed as an object, procedure, or function. Nevertheless, the identification module of executable code without physically located together, but may include storage in a different position in the different instructions, when these instructions are logically combined, the configuration module and the module to achieve the requirements of purposes.

In fact, the executable code module may be a single instruction, or many instructions, and may even be distributed over several different code segments, among different programs distributed, and distributed across multiple memory devices. Similarly, operational data may be identified in the module, and may be implemented by any suitable form and organized in any suitable type of data structure. The operation data may be collected as a single data set, or may be distributed in different locations (including different storage devices), and at least partially be present only as electronic signals on a system or network.

The module can be implemented using software, taking into account the level of existing hardware technology, it can be implemented in software modules, without considering the cost of the case, the skilled person can set up the hardware circuit to achieve a corresponding function corresponding to The hardware circuit includes a conventional ultra-large scale integration (VLSI) circuits or gate arrays, and as logic chips, transistors and the like conventional semiconductor or other discrete components. Modules can also use the programmable hardware devices, such as field programmable gate arrays, programmable array logic, programmable logic devices or the like.

In the present invention, various embodiments of the method, the number of the steps cannot be used to define the sequence of steps of, for persons of ordinary skill in the art, without paying any creative work under the premise of the sequence of steps for each change The present invention is also within the scope of.

The above is a preferred embodiment of the present invention, it should be pointed out that for the art of ordinary skill in the principles of the present invention without departing from the premise, you can also make certain improvements and modifications, improvements and modifications are also those should be regarded as the protection scope of the present invention.

What is claimed is:

1. A method for power management of a mobile device, comprising:
　at the mobile device having one or more processors, memory, a battery, and a display:
　　displaying multiple power-saving functions on the display;
　　detecting user selections of one or more of the power-saving functions;
　　in response to the user's selections, turning on the user-selected power-saving functions;
　　while the user-selected power-saving functions are on, performing the following steps:
　　　for a predefined battery power level variation $\Delta n$:
　　　　collecting multiple real-time battery power level samples; and determining a usage time t1 based on the collected real-time battery power level samples;

comparing the usage time t1 with a usage time t2, wherein the usage time t2 corresponds to the predefined battery power level variation Δn while the user-selected power-saving functions are off;

determining, in accordance with the user-selected power-saving functions, an extended usage time Δt of the mobile device, wherein Δt equals to (t1−t2), and a timestamp when the battery of the mobile device will reach a predetermined level; and displaying the extended usage time and the timestamp when the battery of the mobile device will reach the predetermined level on the display.

2. The method of claim 1, wherein the steps of collecting multiple real-time battery power level samples and determining a usage time t1 based on the collected real-time battery power level samples further include:

receiving, while the user-selected power-saving functions are on, at least two real-time battery power level samples of the mobile device corresponding to two different time samples and the real-time battery power level sample corresponding to the last time sample is the most recent sampled value;

establishing a real-time battery power consumption model, while the user-selected power-saving functions are on, according to the two battery power level samples of the mobile device at the two different time samples as well as an amount of battery power level variation between the two different time samples; and according to the real-time battery power consumption model of the mobile device, determining the usage time t1 corresponding to the battery power level variation Δn while the mobile device uses the user-selected power-saving functions.

3. The method of claim 2, wherein the real-time battery power consumption model is established by:

after the user-selected power-saving functions are turned on:

receiving a first real-time battery power level sample and a corresponding first time sample;

receiving a second real-time battery power level sample and a corresponding second time sample; and generating a linear real-time battery power consumption model using the first real-time battery power level sample, the first time sample, the second real-time battery power level sample and the second time sample.

4. The method of claim 3, wherein the linear real-time battery power consumption model is represented by a line between a first point and a second point in a coordinate system with time being its horizontal axis and battery power level being its vertical axis, the first point defined by the first real-time battery power level sample and the first time sample and the second point defined by the second real-time battery power level sample and the second time sample.

5. The method of claim 2, wherein the real-time battery power consumption model is established by:

receiving a first real-time battery power level sample and a corresponding first time sample;

receiving a second real-time battery power level sample and a corresponding second time sample;

receiving a third real-time battery power level sample and a corresponding third time sample; and generating a non-linear real-time battery power consumption model using the first real-time battery power level sample, the first time sample, the second real-time battery power level sample, the second time sample, the third real-time battery power level sample and the third time sample.

6. The method of claim 5, wherein the non-linear real-time battery power consumption model is represented by a curve along a first point, a second point and a third point in a coordinate system with time being its horizontal axis and battery power level being its vertical axis, the first point defined by the first real-time battery power level sample and the first time sample and the second point defined by the second real-time battery power level sample and the second time sample and the third point defined by the third real-time battery power level sample and the third time sample.

7. The method of claim 2, wherein the predefined battery power level variation Δn is a difference between a full battery power level and a current battery power level and the usage time t1 corresponds to a time period starting with the full battery power level and ending with the current battery power level according to the real-time battery power consumption model while the mobile device uses the user-selected power-saving functions.

8. The method of claim 1, wherein the usage time t2 corresponds to the predefined battery power level variation Δn while the user-selected power-saving functions are off is determined using a battery power consumption prediction model and the battery power consumption prediction model includes multiple entries, each entry including a respective battery power level and an associated time period it takes for the mobile device to reach the respective battery power level from a full battery power level.

9. The method of claim 8, wherein the battery power consumption model is generated right after the mobile device is turned on and before any power-saving functions is turned on.

10. The method of claim 8, wherein the battery power consumption prediction model is established by:

before the user-selected power-saving functions are on:

receiving a first real-time battery power level sample and a corresponding first time sample;

receiving a second real-time battery power level sample and a corresponding second time sample; and generating a linear battery power consumption prediction model using the first real-time battery power level sample, the first time sample, the second real-time battery power level sample and the second time sample.

11. The method of claim 8, wherein the battery power consumption prediction model is established by:

receiving a first real-time battery power level sample and a corresponding first time sample;

receiving a second real-time battery power level sample and a corresponding second time sample;

receiving a third real-time battery power level sample and a corresponding third time sample; and generating a non-linear battery power consumption prediction model using the first real-time battery power level sample, the first time sample, the second real-time battery power level sample, the second time sample, the third real-time battery power level sample and the third time sample.

12. The method of claim 1, further comprising:

for the predefined battery power level variation Δn:

determining a potential usage time t3 based on a combination of the collected real-time battery power level samples and the power-saving functions that the user has not selected yet;

comparing the potential usage time t3 with the usage time t2 to determine a potentially extended usage time of the mobile device Δt'=t3−t2; and displaying the potentially extended usage time Δt' on the display.

13. The method of claim 12, further comprising:

generating a power-conservation score for the user-selected power-saving functions based on the extended usage time Δt and the potentially extended usage time Δt'; and displaying the power-conservation score on the display along with the extended usage time Δt.

14. The method of claim 12, further comprising:

displaying the power-saving functions that the user has not selected yet along with the potentially extended usage time Δt';

receiving a user instruction to select at least a subset of the power-saving functions that the user has not selected yet; and updating the usage time t1 by collecting multiple real-time battery power level samples after turning on the newly user-selected power-saving functions and determining the updated usage time t1 based on the newly collected real-time battery power level samples.

15. A mobile device comprising:

one or more processors;

memory;

a battery; and one or more program modules stored in the memory and to be executed by the one or more processors, the one or more program modules including instructions for:

displaying multiple power-saving functions on a display of the mobile device;

detecting user selections of one or more of the power-saving functions;

in response to the user's selections, turning on the user-selected power-saving functions;

while the user-selected power-saving functions are on, performing the following steps:

for a predefined battery power level variation Δn:

collecting multiple real-time battery power level samples; and determining a usage time t1 based on the collected real-time battery power level samples;

comparing the usage time t1 with a usage time t2, wherein the usage time t2 corresponds to the predefined battery power level variation Δn while the user-selected power-saving functions are off;

determining, in accordance with the user-selected power-saving functions, an extended usage time Δt of the mobile device, wherein Δt equals to (t1−t2), and a timestamp when the battery of the mobile device will reach a predetermined level; and displaying the extended usage time Δt and the timestamp when the battery of the mobile device will reach the predetermined level on the display.

16. The mobile device of claim 15, wherein the instructions for collecting multiple real-time battery power level samples and determining a usage time t1 based on the collected real-time battery power level samples further include instructions for:

receiving, while the user-selected power-saving functions are on, at least two real-time battery power level samples of the mobile device corresponding to two different time samples and the real-time battery power level sample corresponding to the last time sample is the most recent sampled value;

establishing a real-time battery power consumption model, while the user-selected power-saving functions are on, according to the two battery power level samples of the mobile device at the two different time samples as well as an amount of battery power level variation between the two different time samples; and according to the real-time battery power consumption model of the mobile device, determining the usage time t1 corresponding to the battery power level variation Δn while the mobile device uses the user-selected power-saving functions.

17. The mobile device of claim 16, wherein the real-time battery power consumption model is established by:

receiving a first real-time battery power level sample and a corresponding first time sample;

receiving a second real-time battery power level sample and a corresponding second time sample;

receiving a third real-time battery power level sample and a corresponding third time sample; and generating a non-linear real-time battery power consumption model using the first real-time battery power level sample, the first time sample, the second real-time battery power level sample, the second time sample, the third real-time battery power level sample and the third time sample.

18. The mobile device of claim 16, wherein the predefined battery power level variation Δn is a difference between a full battery power level and a current battery power level and the usage time t1 corresponds to a time period starting with the full battery power level and ending with the current battery power level according to the real-time battery power consumption model while the mobile device uses the user-selected power-saving functions.

19. The mobile device of claim 15, wherein the usage time t2 corresponds to the predefined battery power level variation Δn while the user-selected power-saving functions are off is determined using a battery power consumption prediction model and the battery power consumption prediction model includes multiple entries, each entry including a respective battery power level and an associated time period it takes for the mobile device to reach the respective battery power level from a full battery power level.

20. A non-transitory computer readable medium used in conjunction with a mobile device for power management, the mobile device having one or more processors, memory, a battery, and a display, the computer readable medium comprising instructions for:

displaying multiple power-saving functions on the display;

detecting user selections of one or more of the power-saving functions;

in response to the user's selections, turning on the user-selected power-saving functions;

while the user-selected power-saving functions are on, performing the following steps:

for a predefined battery power level variation Δn:

collecting multiple real-time battery power level samples; and determining a usage time t1 based on the collected real-time battery power level samples;

comparing the usage time t1 with a usage time t2, wherein the usage time t2 corresponds to the predefined battery power level variation Δn while the user-selected power-saving functions are off;

determining, in accordance with the user-selected power-saving functions, an extended usage time Δt of the mobile device, wherein Δt equals to (t1−t2), and a timestamp when the battery of the mobile device will reach a predetermined level; and displaying the extended usage time and the timestamp when the battery of the mobile device will reach the predetermined level on the display.

* * * * *